E. A. BIRCHER.
FILM WINDER.
APPLICATION FILED NOV. 20, 1909.
960,795.
Patented June 7, 1910.
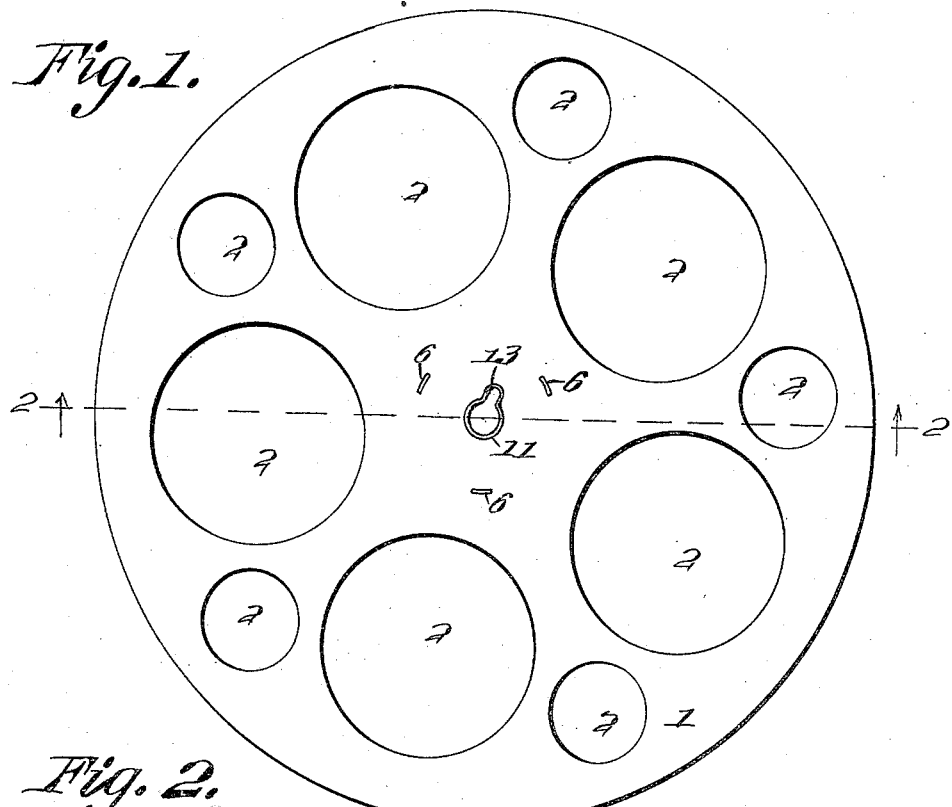
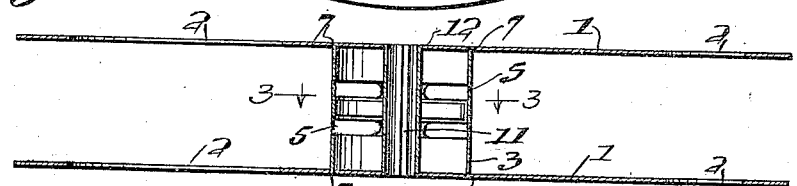
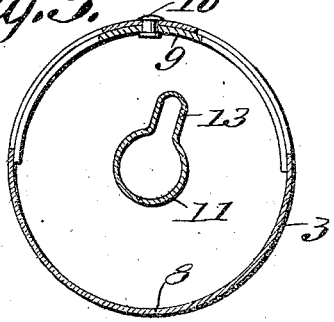
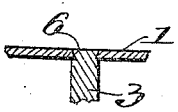
Witnesses
A. M. Whitmore.
C. C. Culver.
Inventor
Eugene A. Bircher,
by E. B. Whitmore,
Attorney
ANDREW B. GRAHAM CO., PHOTO-LITHOGRAPHERS, WASHINGTON, D. C.

UNITED STATES PATENT OFFICE.

EUGENE A. BIRCHER, OF ROCHESTER, NEW YORK, ASSIGNOR TO STEPHEN H. KENDALL, OF ROCHESTER, NEW YORK.

FILM-WINDER.

960,795.  Specification of Letters Patent.  Patented June 7, 1910.

Application filed November 20, 1909. Serial No. 529,064.

*To all whom it may concern:*

Be it known that I, EUGENE A. BIRCHER, of Rochester, in the county of Monroe and State of New York, have invented a new and useful Improvement in Film-Winders, which improvement is fully set forth in the following specification and shown in the accompanying drawings.

This invention relates to certain new and useful improvements in film winders or reels or spools designed primarily for use in connection with films such as are employed in moving picture machines, although, of course, applicable to other uses.

It has for its objects among others to provide a simple and efficient film winder or reel composed entirely of metal, light, durable and by the employment of which the film may be wound onto the hub when turned in either direction, as circumstances may require.

It has for a further object to provide a reel having its hub so connected with the outside portions or heads as to leave the two outside surfaces of the latter perfectly smooth.

I provide a central axial sleeve held to the opposite heads of the reel, so as to prevent endwise movement thereof and form said sleeve with a side projection adapted to receive a spline or the like on the shaft upon which the reel is designed to be moved, so as to prevent its turning upon the shaft. The hub is provided interiorly with a spring disposed opposite the oppositely extending tongues, beneath which latter the ends of the films are to be engaged and firmly held.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a face view of my improved reel. Fig. 2 is a central cross section on the line 2—2 of Fig. 1, looking in the direction of the arrows. Fig. 3 is a cross section through the hub, as on the line 3—3 of Fig. 2, looking in the direction of the arrows. Fig. 4 is a side elevation of the hub. Fig. 5 is a slightly enlarged sectional detail which will be more particularly referred to.

Like numerals of reference indicate like parts throughout the different views.

Referring to the drawings, 1 designates a pair of circular members, preferably of steel, provided with openings 2 for the sake of lightness. These may be of any desired diameter and of a thickness sufficient to give them the rigidity necessary. These members or plates 1 are spaced apart and held in proper parallel relation by means of a hub which, as seen in Figs. 3 and 4, is formed of a sheet of metal, preferably steel, bent to a circular form. This hub 3 comprises a body portion having two tongues 4 with their free ends turned in opposite directions so that the film may be wound onto the hub when turned in either direction, according to circumstances. In order to form these winding tongues, portions of the hub are cut-away, as seen at 5, leaving the tongues as integral parts of the hub. The hub is formed upon opposite ends with projections 6 which pass through corresponding slots 7 in the plates 1, as seen in Figs. 1 and 2, and by riveting these projecting parts down slightly or spreading them with a hammer or other suitable instrument, after they have been passed through the slots in the plates or members 1, when assembling the parts, the hub is held rigidly in place, and also the two plates or members 1. This leaves the outer surfaces of the two plates or members 1 perfectly smooth, as will be seen clearly in Fig. 2, so that there is no projecting part to catch into or interfere with the proper use of the reel. Fig. 5 indicates more clearly the evenness or smooth outer surfaces of the plate after the hub has been thus secured in position. The adjacent ends of the material forming the hub need not be secured at the joint 8 as the resiliency of the metal is sufficient to hold them together and, furthermore, the affixing of the hub to the plates or members 1 insures rigidity of the parts.

9 is a spring held in place by a rivet or the like 10 within the hub and designed to act outwardly against the elastic tongues 4 under which the end of the film to be wound is inserted for holding it in place. The ends of this spring overlap the end walls of the slots or spaces formed by the cutting away of the material to produce the tongues, as is evident from Fig. 3.

11 is the central axial sleeve. It is passed through corresponding openings at the center of the members 1 and is slightly spread out at its ends, as seen at 12, by any suitable means, as by the tapping of the same with a hammer, just sufficiently to hold it at each end upon the plates 1, so that it will not move endwise out of place. This is formed of a single piece of metal, preferably steel, punched out and then bent into the requisite form, producing a side projection 13 of less diameter than the main portion of the sleeve, as seen clearly in Figs. 1 and 3, this extension or side projection 13 extending the entire length of the sleeve and serving to receive a spline or longitudinal projecting part of the shaft upon which the reel or device is mounted, to prevent the turning of the reel upon the shaft.

The device above described can be cheaply and readily constructed, the parts being all stamped out with the openings punched out by means of suitable dies. The parts are all alike and may be punched out in quantities from sheets of steel and the parts readily assembled to form the completed reel. The mode of use will be apparent; the end of the film is inserted under one or the other of the tongues 4 and the outward pressure of the spring, together with the inward pressure of the spring tongue, serves to firmly hold the film in place. The oppositely extending tongues permit of the application of the film to either side, as circumstances may require.

Modifications in details may be resorted to without departing from the spirit of the invention or sacrificing any of its advantages.

What I claim as new is:—

1. A reel or film winder comprising opposite plates and a central hub interposed therebetween and secured thereto with the outer faces of the plates smooth, said hub provided with an opening and a corresponding tongue, and a spring upon the interior of the hub.

2. A reel or film winder comprising opposite plates, a central hub interposed therebetween and secured thereto with the outer faces of the plates smooth, the hub being formed with a slot and a tongue, and a spring upon the interior of the hub opposite said tongue.

3. A reel or film winder comprising opposite plates and a central hub interposed therebetween and secured thereto with the outer faces of the plates smooth, the hub having slots and being formed with oppositely disposed spring tongues, and a spring ring within the hub having portions opposite said tongues.

4. A reel or film winder comprising opposite plates and a central hub interposed therebetween and secured thereto with the outer faces of the plates smooth, the hub being formed with slots and oppositely disposed spring tongues, and a spring within the hub disposed opposite said tongues.

5. A reel or film winder composed entirely of metal parts and embodying separated plates, a central hub uniting said plates and provided with slots and spring tongues oppositely disposed, a spring within the hub opposite said tongues, and an axial sleeve having a laterally projecting part to engage the spline on a shaft.

In witness whereof, I have hereunto set my hand this 18th day of November, 1909, in the presence of two subscribing witnesses.

EUGENE A. BIRCHER.

Witnesses:
 E. B. WHITMORE,
 A. M. WHITMORE.